United States Patent
Lauzon

(10) Patent No.: US 9,060,500 B2
(45) Date of Patent: Jun. 23, 2015

(54) MONOMANUEL ELECTRIC FISHING ROD AND REEL

(76) Inventor: Paul Lauzon, Tiverton (CA)

( * ) Notice: Subject to any disclaimer, the term of this patent is extended or adjusted under 35 U.S.C. 154(b) by 692 days.

(21) Appl. No.: 13/449,564

(22) Filed: Apr. 18, 2012

(65) Prior Publication Data

US 2013/0276348 A1    Oct. 24, 2013

(51) Int. Cl.
| | | |
|---|---|---|
| A01K 87/06 | (2006.01) | |
| A01K 89/017 | (2006.01) | |
| A01K 87/00 | (2006.01) | |
| A01K 87/08 | (2006.01) | |
| A01K 89/012 | (2006.01) | |

(52) U.S. Cl.
CPC ............ *A01K 89/017* (2013.01); *A01K 87/007* (2013.01); *A01K 87/08* (2013.01); *A01K 89/012* (2013.01)

(58) Field of Classification Search
CPC .................................................. A01K 89/017
USPC ....................... 43/21, 26.1; 242/223, 225, 226
See application file for complete search history.

(56) References Cited

U.S. PATENT DOCUMENTS

| 3,248,819 | A | * | 5/1966 | Stealy | ............................ 242/225 |
| 3,437,282 | A | * | 4/1969 | Larime et al. | ................. 242/225 |
| 4,515,324 | A | | 5/1985 | Barton | |
| 4,634,072 | A | * | 1/1987 | Stealy | ............................ 242/225 |
| 5,004,181 | A | | 4/1991 | Fowles | |
| 6,056,219 | A | * | 5/2000 | Barkley | ......................... 242/225 |
| 6,880,775 | B1 | * | 4/2005 | Wenzel | .......................... 242/225 |

\* cited by examiner

*Primary Examiner* — Christopher P Ellis
*Assistant Examiner* — Richard G Davis
(74) *Attorney, Agent, or Firm* — Crossley Patent Law

(57) ABSTRACT

A monomanual electric fishing rod and reel that includes a control module having a power button and a throttle button disposed thereon, said power and throttle buttons operationally communicating with a CPU disposed in a rear rod section, said CPU operationally communicating with a silent direct-drive electric gear motor disposed within a housing upon an electric reel, wherein the electric reel is alternatively activated and deactivated by a user, an extant cast line is reeled in at different speeds selectable by the user, and a rechargeable Lithium-ion battery is disposed in an attachable handle for extended use capacity whereby one-handed operation of the device is enabled.

13 Claims, 6 Drawing Sheets

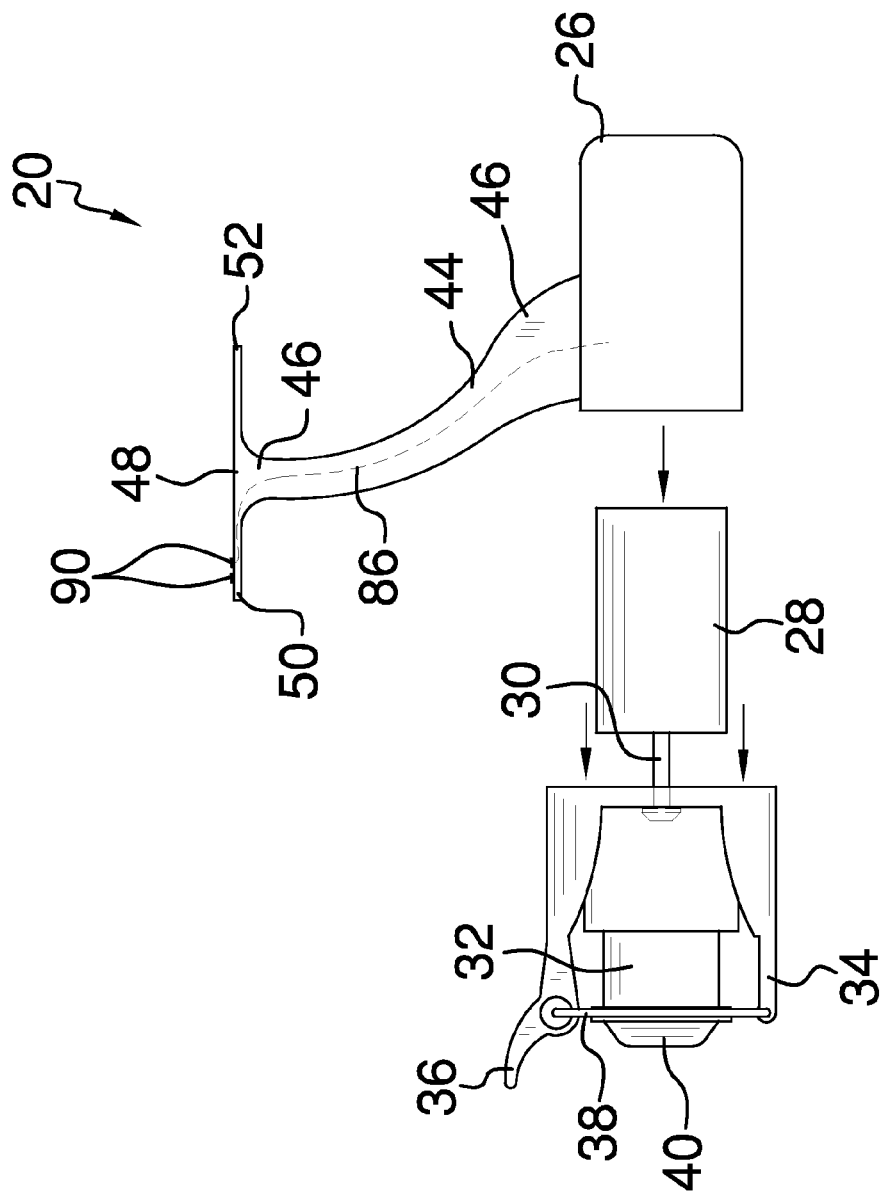

MONOMANUEL ELECTRIC FISHING ROD AND REEL

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of electric fishing rods and reels are known in the prior art. However, what is needed is a monomanual electric fishing rod and reel that includes a control module having a power button and a throttle button disposed thereon, said power and throttle buttons operationally communicating with a CPU disposed in a rear rod section, said CPU operationally communicating with a silent direct-drive electric gear motor disposed within a housing upon an electric reel, wherein the electric reel is alternatively activated and deactivated by a user, an extant cast line is reeled in at different speeds selectable by the user, and a rechargeable Lithium-ion battery is disposed in an attachable handle for extended use capacity whereby one-handed operation of the device is enabled.

FIELD OF THE INVENTION

The present invention relates to a monomanual electric fishing rod and reel, and more particularly, to a monomanual electric fishing rod and reel that includes a control module having a power button and a throttle button disposed thereon, said power and throttle buttons operationally communicating with a CPU disposed in a rear rod section, said CPU operationally communicating with a silent direct-drive electric gear motor disposed within a housing upon an electric reel, wherein the electric reel is alternatively activated and deactivated by a user, an extant cast line is reeled in at different speeds selectable by the user, and a rechargeable Lithium-ion battery is disposed in an attachable handle for extended use capacity whereby one-handed operation of the device is enabled.

SUMMARY OF THE INVENTION

The general purpose of the monomanual electric fishing rod and reel, described subsequently in greater detail, is to provide a monomanual electric fishing rod and reel which has many novel features that result in a monomanual electric fishing rod and reel which is not anticipated, rendered obvious, suggested, or even implied by prior art, either alone or in combination thereof.

Electric fishing reels are seen in the prior art. But what is needed is a monomanual electric fishing rod and reel whereby a person may fish one-handedly. The term "monomanual" as used in this specification is taken to mean "useable one-handedly". The present invention offers new and useful improvements over the prior art including a Lithium-ion battery combining high capacity and long performance to enable extended use of the present monomanual electric fishing rod and reel. A control module is also included with a power button and a throttle button disposed thereupon. Each of the power button and throttle button enable monomanual use, and are disposed to be proximal to a user's thumb when the device is wielded by said user. The power button activates an electric reel, and the throttle button operationally controls the speed settings of the reel. When the power button is depressed, the reel is accelerated at the speed set by the throttle button. When the power button is released, the reel decelerates. The use of a winding handle, as is typical of other reels prevalent in the prior art, is obviated by the present invention.

The present monomanual electric fishing rod and reel includes a Central Processing Unit (CPU), in operational communication with the power button, the throttle button, and a silent, direct-drive electric gear motor disposed in a water proof housing upon the electric reel. The electric gear motor operationally drives a drive shaft, which drive shaft operationally engages a rotor to draw in an extant line cast out from the monomanual electric fishing rod and reel. For repair and maintenance, the housing is removably attached to the reel, whereby the motor may be accessed, as needed.

The CPU sends command signals to the electric gear motor, said signals initiated by means of the power button and the throttle button. A number of programmable sequences are envisioned, the throttle button activating and deactivating said sequences by a plurality of depression tactics initiated by the power button and the throttle button. The term "depression tactics", as used herein, relates to a sequence of depressions of the power button and alternately the throttle button initiating a known command signal from the CPU. For example, depressing the throttle button twice in rapid succession is envisioned to signal a programmed medium-speed setting of the reel, as activated by the CPU and driven by the electric gear motor. Depressing the throttle button a third time signals a programmed high-speed setting of the reel. Another depression tactic, for example, includes pressing the throttle button once to initiate a constant rotational speed of the reel, and then a second time to accelerate the reel, and a third time to decelerate the reel. It is not intended that the depression tactics of the power button and the throttle button, operatively communicating command signals to be relayed by the CPU, limit the device by the example aforementioned. The number of depression tactics, and the mode of communicating individual depression tactics to the CPU to relay specific command signals to the electric reel, are dependent upon programming the CPU. The examples given are so given to define the scope and spirit of the device. However, the inclusion of depression tactics—to relay specific command signals from the CPU—are considered as part of the present monomanual electric fishing rod and reel and offer a new and useful improvement in the art.

The electric reel is mountable to a rear rod section. The rear rod section includes the control module, a rearward end, and a mount slot is disposed between the control module and the rearward end wherein a front foot section of a support arm of the reel is releasably insertable. A slip ring is disposed on the rear rod section, and a rear foot section disposed on the support arm of the reel releasably inserts beneath the slip ring. The reel is removably attachable to the rear rod section by means of the front foot section releasably engaging with the mount slot and the rear foot section releasably engaging with the slip ring. The slip ring is slidably moveable upon the rear rod section, and the reel may be quickly dismounted from the rear rod section by slidably moving the slip ring to disengage the rear foot section of the support arm, as desired.

The handle includes a female quick-disconnect connector disposed on a front end of the handle. The rear rod section includes a male quick-disconnect connector disposed on the rearward end. The handle and the rear rod section are releasably connectable when the male quick-disconnect connector is inserted into the female quick-disconnect connector.

The handle also includes an aft end and a charger port disposed at the aft end. A charger attachment is connectable to the charger port, and the battery is thereby chargeable when the charger attachment is connected to an extant power source.

A plurality of wiring is disposed interiorly to connect the power button, the throttle button, the CPU, the electric reel, and the battery in circuit. When the handle is releasably connected to the rear rod section the battery is interconnected in circuit with the plurality of wiring. A plurality of connectors is disposed upon the foot portion of the reel support arm whereby the motor is connected in circuit with the battery, the CPU, and the control module when the reel is mounted to the rear rod section.

For ease of use in one-handed fishing, a casting trigger is pivotally disposed upon the reel, the casting trigger moveable between a first position and a second position. When the casting trigger is moved to the second position, the casting trigger opens a bail from the reel whereby extant line may be fed from the reel. When the power button is activated the reel begins to spin, the casting trigger is moved to the first position, the bail is closed, and the line is secured upon the reel. The CPU is configured to deactivate the electric gear motor when the line drags.

Thus has been broadly outlined the more important features of the present monomanual electric fishing rod and reel so that the detailed description thereof that follows may be better understood and in order that the present contribution to the art may be better appreciated.

Objects of the present monomanual electric fishing rod and reel, along with various novel features that characterize the invention are particularly pointed out in the claims forming a part of this disclosure. For better understanding of the monomanual electric fishing rod and reel, its operating advantages and specific objects attained by its uses, refer to the accompanying drawings and description.

BRIEF DESCRIPTION OF THE DRAWINGS

Figures

FIG. 6 is an exploded view of an electric reel.

DETAILED DESCRIPTION OF THE DRAWINGS

Figure 1:
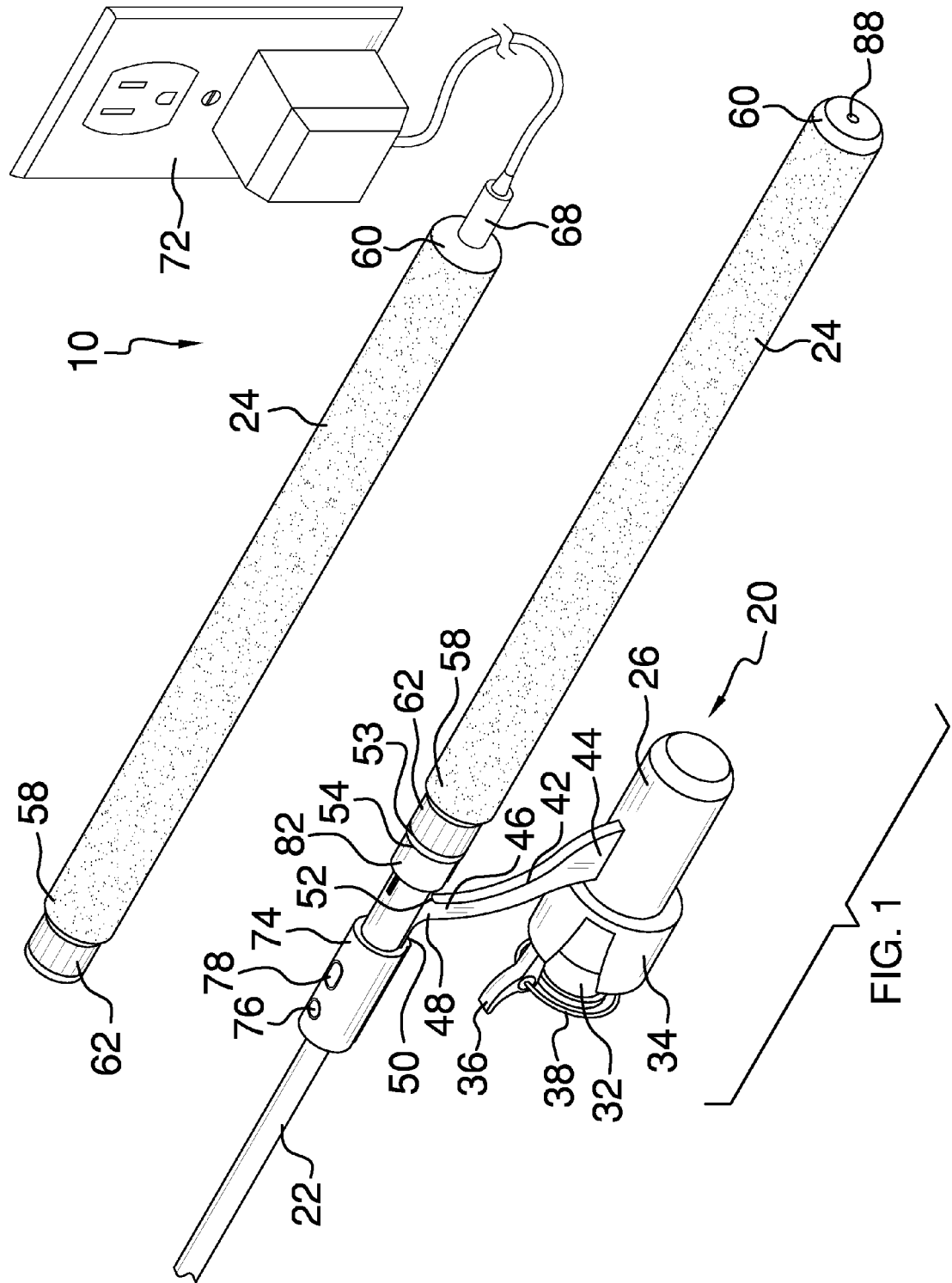
FIG. 1 is an isometric view.
Figure 2:
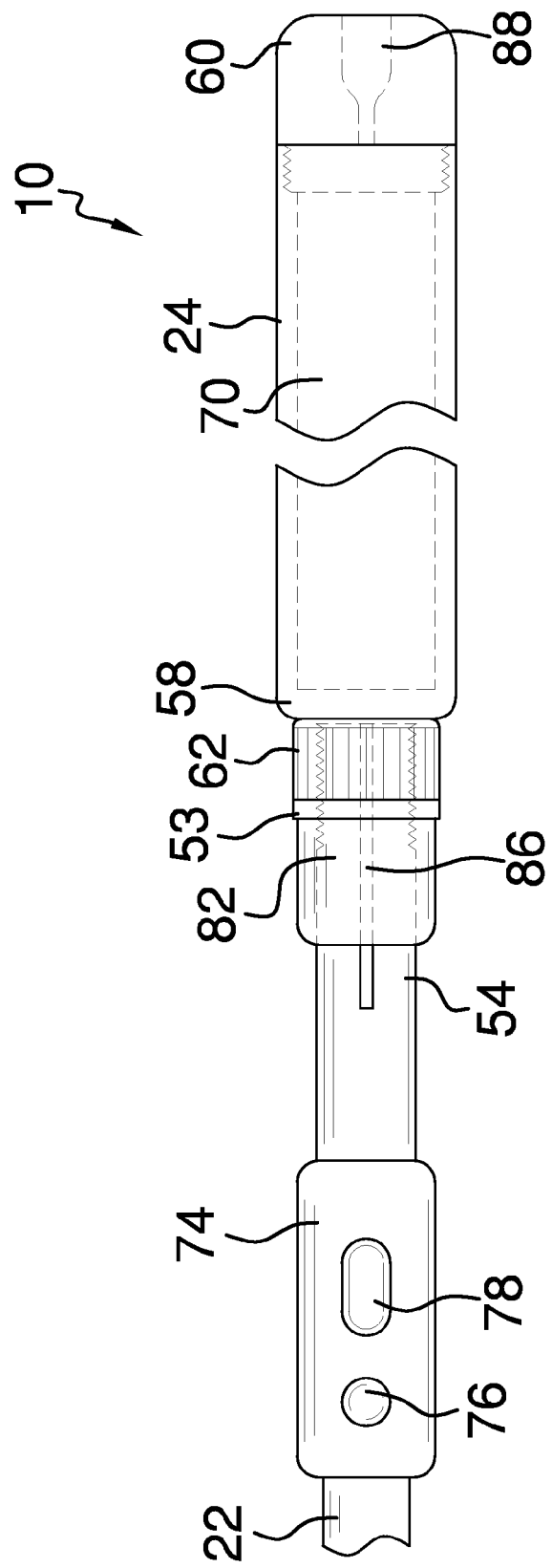
FIG. 2 is a top view.
Figure 3:
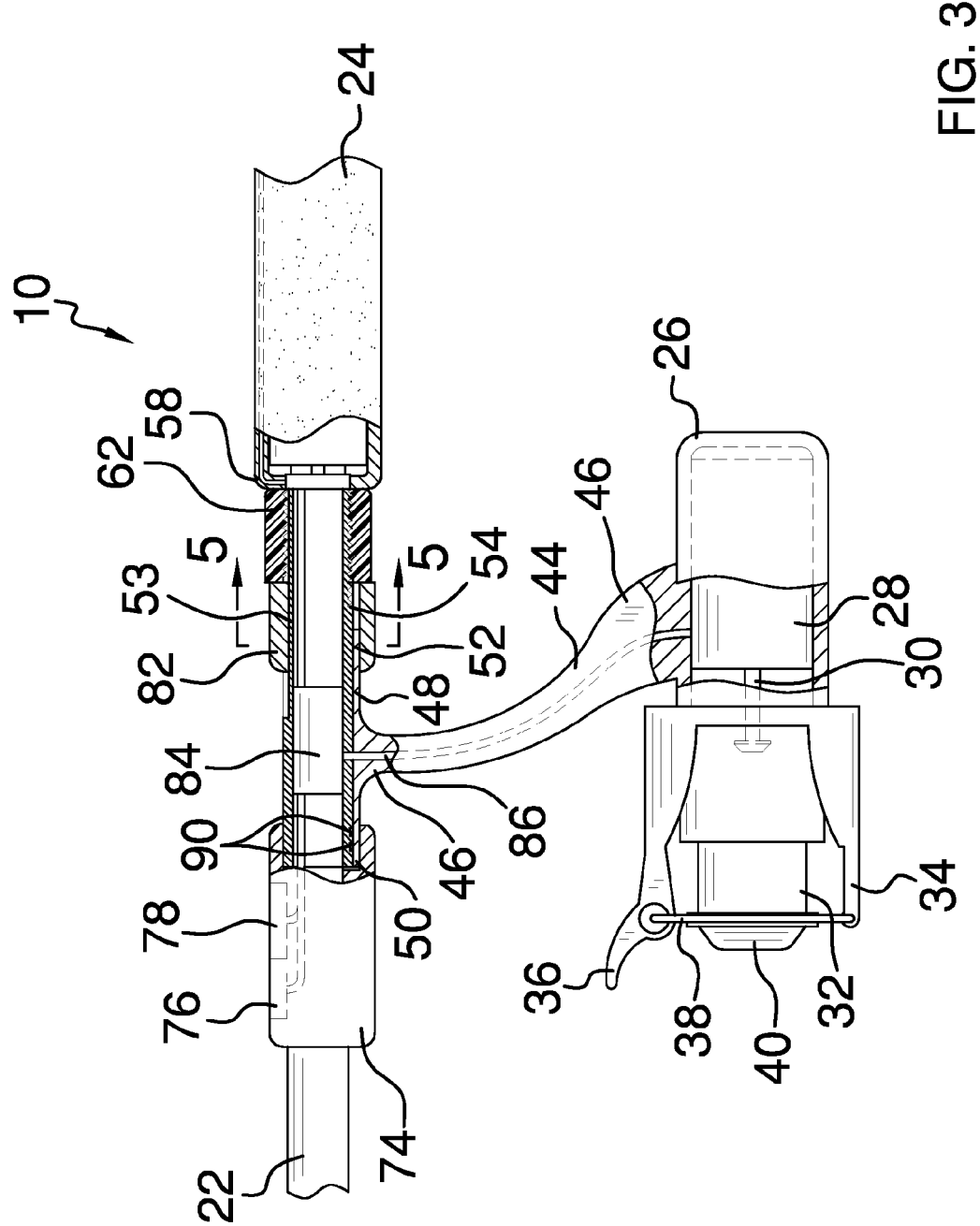
FIG. 3 is a side view.
Figure 4:
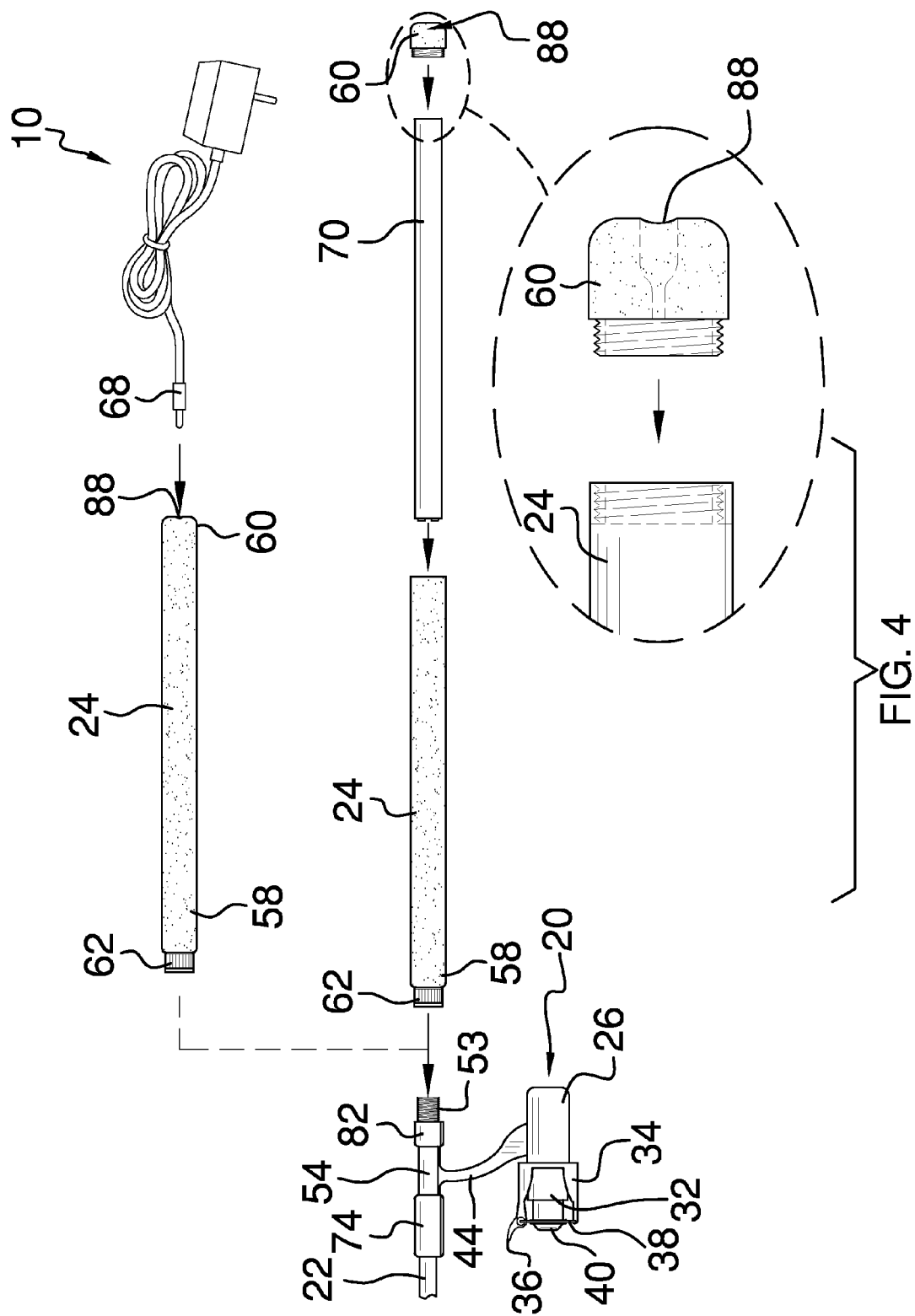
FIG. 4 is a detail view of a handle.
Figure 5:
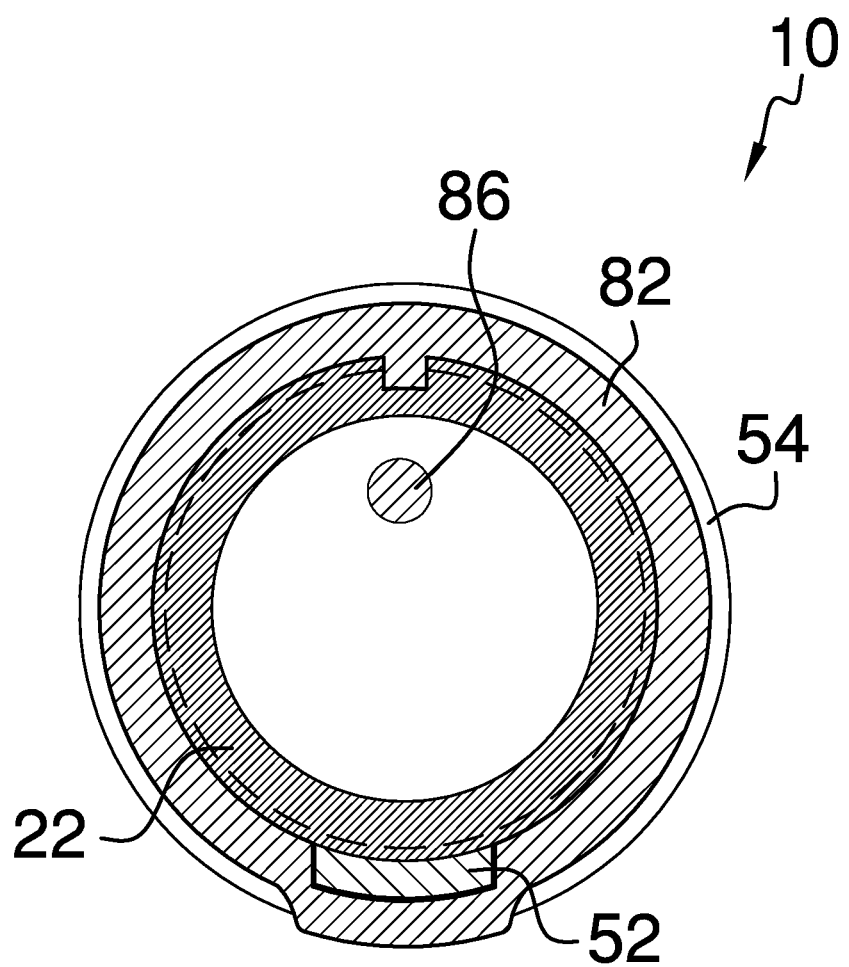
FIG. 5 is a cross-section view taken along the line 5-5 of FIG. 3.

With reference now to the drawings, and in particular FIGS. 1 through 6 thereof, example of the instant monomanual electric fishing rod and reel employing the principles and concepts of the present monomanual electric fishing rod and reel and generally designated by the reference number 10 will be described.

Referring to FIGS. 1 through 6 a preferred embodiment of the present monomanual electric fishing rod and reel 10 is illustrated.

The monomanual electric fishing rod and reel 10 is devised to enable a person to fish one-handedly and includes an electric reel 20 releasably attachable to a rear rod section 22. The electric reel 20 includes a generally cylindrical, removably attachable housing 26. A silent direct-drive electric gear motor 28 is disposed within the housing 26, the electric gear motor 28 in operational communication with a drive shaft 30. A rotor 31, rotatably disposed upon the housing 26 around a spool 32, is in operational communication with the drive shaft 30.

An anti-reverse lever 34 is disposed upon the housing 26. A casting trigger 36 is pivotally disposed upon the rotor 31. A bail 38 is in operational communication with the casting trigger 36. The casting trigger 36 releases the bail 38 when casting, as desired, allowing extant line to slip from the spool 32. A drag adjustment knob 40 is disposed upon the reel 20. The drag adjustment knob 40 adjusts the drag setting on the extant line, as desired, for example when reeling larger fish.

A support arm 42 is disposed upon the housing 26, the support arm 42 including an arm portion 44 attached to the reel 20, an upper end 46, and a foot portion 48 disposed perpendicularly upon the upper end 46. The foot portion 48 includes a front foot section 50 and a rear foot section 52. A plurality of contacts 90 are disposed upon the foot portion 48, said contacts 90 interconnecting the reel 20 in circuit with the rear rod section 22 when the reel 20 is mounted to the rear rod section 22 (see FIG. 3 and FIG. 6).

The rear rod section 22 includes a male quick-disconnect connector 53 disposed on a rearward end 54. The handle 24 includes a front end 58, an aft end 60, and a female quick-disconnect connector 62 disposed on the front end 58. The male quick-disconnect connector 53 is configured to be releasably insertable into the female quick-disconnect connector 62. Once the male quick-disconnect connector 53 of the rear rod section 22 is positioned within the female quick-disconnect connector 62 of the handle 24, the handle 24 is releasably fastened in circuit with the rear rod section 22 (see FIG. 2 and FIG. 5).

The female quick-disconnect connector 62 releasably attaches the handle 24 to the rear rod section 22 male quick-disconnect connector 53 and connects the handle 24 in circuit with the rear rod section 22. A rechargeable Lithium-ion battery 70 is disposed within the handle 24. A charger port 88 is disposed endwise upon the handle 24 aft end 60, and a charger attachment 68 is connectable to the charger port 88. The charger attachment 68 is connectable to an extant power outlet 72 and the Lithium-ion battery 70 is rechargeable within the handle 24 thereby. The present device 10 is considered having a plurality of handles 24 whereby one handle 24 may be attached to the device for use while a second handle 24 is charging (see FIG. 4).

A control module 74 is disposed upon the rear rod section 22. The control module 74 includes a power button 76 disposed upon the control module 74, a throttle button 78 disposed upon the control module 74, and a mount slot 80. The reel 20 front foot section 50 releasably inserts into the mount slot 80 when the reel 20 is mounted to the monomanual electric fishing rod and reel 10. The plurality of contacts 90 contacts disposed upon the foot portion 48 operationally connect the reel 20 in circuit with the battery 70 when the reel 20 is mounted to the mount slot 80 (see FIG. 3).

A slip ring 82 is disposed endwise upon the rear rod section 22. The slip ring 82 is configured to releasably engage with the rear foot section 52 of the foot portion 48 of the reel 20 support arm 42 when the reel 20 is mounted to the monomanual electric fishing rod and reel 10 for use. The front foot section 50 of the support arm 42 therefore releasably inserts into the mount slot 80 disposed on the rear rod section 22 and the rear foot section 52 releasably inserts into the slip ring 82 and the reel 20 is removably secured to the monomanual electric fishing rod and reel 10 thereby. The reel 20 may be readily interchanged with alternate reels, as desired, by disengaging the slip ring 82, as is seen in the prior art.

A CPU 84 is disposed within the rear rod section 22, the CPU 84 in operational communication with the power button 76 and the throttle button 78. A plurality of wiring 86 interconnects the power button 72, the throttle button 74, the CPU 84, and the electric gear motor 28 in circuit, said plurality of wring 86 disposed within the rear rod section 22, the support arm 42, and the housing 26. The plurality of contacts 90 disposed on the foot portion 48 of the reel 20 support arm 42 releasably interconnect the reel 20 and the rear rod section 22 in circuit with the reel 20 is removably mounted to the rear rod section 22. When the handle 24 is releasably attached to the rear rod section 22 the handle 24 interconnects the battery 70 with the plurality of wiring 86. The devise 10 is then ready for use in one-handed fishing (see FIG. 3).

The power button 76 activates the electric reel 20 and the throttle button 78 operationally controls the speed settings of the electric motor 28. Moreover, each of a plurality of depression tactics is considered to initiate each of a plurality of command signals relayed from the CPU to the electric reel 20 to control the speed, acceleration, and rotation of the spool whereby the monomanual electric fishing rod and reel 10 is operable one-handedly by a user. The CPU is configured to deactivate the motor when the line drags from the reel 20.

What is claimed is:

1. A monomanual electric fishing rod and reel comprising:
   a rear rod section;
   an electric reel having a removable housing, the reel removably attachable in circuit with the rear rod section;
   an electric gear motor disposed within the housing, the motor in operational communication with the reel;
   a control module disposed upon the rear rod section, the control module having a power button and a throttle button disposed thereupon, the control module in operational communication with the motor;
   a CPU disposed within the rear rod section, the CPU in operational communication with the control module;
   a handle releasably attachable to the rear rod section;
   a battery disposed within the handle;
   a charger port disposed upon the handle;
   wherein each of a plurality of depression tactics initiates each of a plurality of command signals relayed from the CPU to the electric reel, wherein the speed, acceleration, and rotation of the reel is controllable and the monomanual electric fishing rod and reel is operable one-handedly.

2. The monomanual electric fishing rod and reel of claim 1 wherein the reel further comprises:
   a support arm disposed upon the housing;
   a foot portion disposed atop the support arm;
   a plurality of contacts disposed upon the foot portion;
   wherein the foot portion releasably interconnects with the rear rod section and the plurality of contacts engage in circuit with the control module, the CPU, and the battery, to operationally engage the motor, when the reel is releasably attached to the rear rod section.

3. The monomanual electric fishing rod and reel of claim 2 wherein the CPU is configured to deactivate the motor when extant line drags from the reel.

4. The monomanual electric fishing rod and reel of claim 3 wherein the handle further comprises an aft end, the charger port disposed at the aft end whereby a charger attachment is connectable to an extant power source and the battery is rechargeable thereby.

5. The monomanual electric fishing rod and reel of claim 4 wherein holding the power button depressed activates the electric reel and increased pressure upon the power button increases the speed of the reel whereby a range of reeling speeds is operable.

6. The monomanual electric fishing rod and reel of claim 5 wherein decreased pressure upon the power button decreases the speed of the reel and release of the power button deactivates the reel.

7. The monomanual electric fishing rod and reel of claim 6 wherein the rear rod section further comprises:
   a rearward end;
   a male quick-disconnect connector disposed at the rearward end;
   wherein the rear rod section is releasably attachable in circuit to the handle.

8. The monomanual electric fishing rod and reel of claim 7 wherein the handle further comprises:
   a front end;
   a female quick-disconnect connector disposed on the front end;
   wherein the female quick-disconnect connector releasably engages with the male quick-disconnect connector and the handle is releasably attachable in circuit to the rear rod section thereby.

9. A monomanual electric fishing rod and reel comprising:
   an electric reel comprising:
      a water proof housing;
      a direct drive electric gear motor disposed within the housing, the electric gear motor in operationally engaging a drive shaft;
      a rotor disposed upon the housing, the rotor in operational communication with the drive shaft;
      a casting trigger pivotally disposed upon the rotor;
      an anti-reverse lever disposed upon the housing;
      a bail in operational communication with the casting trigger;
      a drag adjustment knob disposed upon the reel;
      a support arm disposed upon the reel, said support arm comprising:
         an arm portion affixed to the housing;
         an upper end;
         a foot portion disposed perpendicularly upon the upper end;
         a front foot section disposed upon the foot portion;
         a rear foot section disposed upon the foot portion;
         a plurality of contacts disposed upon the foot portion;
   a rear rod section releasably connectable to the support arm, the rear rod section comprising:
      a rearward end;
      a male quick-disconnect connector disposed at the rearward end;
      a slip ring disposed proximal to the male quick-disconnect connector, the slip ring configured to releasably receive the rear foot section of the reel support arm when the reel is mounted to the rear rod section;
      a CPU disposed within the rear rod section;
      a control module disposed upon the rear rod section;
      a power button disposed upon the control module;
      a throttle button disposed upon the control module;
      a mount slot disposed upon the rear rod section;
      a handle releasably attachable to the rear rod section, the handle comprising:
         a front end;

an aft end;
a female quick-disconnect connector disposed at the front end;
a charger port disposed at the aft end;
a rechargeable Lithium-ion battery disposed within the handle;
a charger attachment removably attachable to the charger port, the charger attachment interconnectable with an extant power source whereby the battery is rechargeable;
a plurality of wiring interconnecting the power button, the throttle button, the CPU, and the electric motor, said plurality of wring disposed within the rear rod section, the support arm, and the housing;
wherein the handle releasably connects the battery in circuit with the plurality of wiring when the handle is releasably attached to the rear rod section;
wherein the power button activates the electric reel and the throttle button controls the speed and acceleration of the electric motor, whereby the monomanual electric fishing rod and reel is operable one-handedly.

10. The monomanual electric fishing rod and reel of claim 9 wherein each of a plurality of depression tactics initiates each of a plurality of command signals relayed from the CPU to the electric reel, wherein the speed, acceleration, and rotation of the rotor is controllable.

11. The monomanual electric fishing rod and reel of claim 10 wherein holding the power button depressed activates the electric reel and increased pressure upon the power button increases the speed of the reel whereby a range of reeling speeds is operable.

12. The monomanual electric fishing rod and reel of claim 11 wherein decreased pressure upon the power button decreases the speed of the reel and release of the power button deactivates the reel.

13. The monomanual electric fishing rod and reel of claim 12 wherein the throttle button selects among a plurality of depression tactics whereby the acceleration of the reel is set at different speeds activatable when the power button is depressed.

* * * * *